United States Patent
Wolf

(10) Patent No.: US 8,205,447 B2
(45) Date of Patent: Jun. 26, 2012

(54) INTERCOOLER DEICING

(75) Inventor: Rainer Wolf, Ingolstadt (DE)

(73) Assignee: Audi AG, Ingolstadt (DE)

( * ) Notice: Subject to any disclaimer, the term of this patent is extended or adjusted under 35 U.S.C. 154(b) by 346 days.

(21) Appl. No.: 12/482,733

(22) Filed: Jun. 11, 2009

(65) Prior Publication Data
US 2009/0320465 A1    Dec. 31, 2009

(30) Foreign Application Priority Data
Jun. 12, 2008 (DE) .......................... 10 2008 028 194

(51) Int. Cl.
*F02B 29/04* (2006.01)
*F02B 33/00* (2006.01)
*F02B 25/06* (2006.01)

(52) U.S. Cl. ........... 60/599; 123/563; 123/564; 123/574

(58) Field of Classification Search ............. 60/599, 60/602; 123/563, 564, 574
See application file for complete search history.

(56) References Cited

U.S. PATENT DOCUMENTS

| | | | | |
|---|---|---|---|---|
| 3,754,538 A | * | 8/1973 | Ephraim et al. | 123/41.86 |
| 6,227,179 B1 | * | 5/2001 | Eiermann et al. | 123/563 |
| 6,378,506 B1 | * | 4/2002 | Suhre et al. | 123/564 |
| 6,817,349 B2 | * | 11/2004 | Awasaka et al. | 123/564 |
| 7,100,584 B1 | * | 9/2006 | Bruestle et al. | 123/563 |
| 7,614,232 B2 | * | 11/2009 | Swenson et al. | 60/611 |
| 2003/0015183 A1 | * | 1/2003 | Sealy et al. | 123/563 |
| 2004/0025507 A1 | * | 2/2004 | Leigh et al. | 60/608 |
| 2006/0037590 A1 | * | 2/2006 | Uzkan et al. | 123/563 |

FOREIGN PATENT DOCUMENTS

| | | |
|---|---|---|
| DE | 672460 | 3/1939 |
| DE | 3104124 A1 | 9/1982 |
| DE | 102007010560 A1 | 10/2007 |
| KR | 1020050062811 A | 6/2005 |

* cited by examiner

*Primary Examiner* — Thomas Denion
*Assistant Examiner* — Cameron Setayesh
(74) *Attorney, Agent, or Firm* — Novak Druce + Quigg LLP

(57) ABSTRACT

The invention relates to a process for operating an internal combustion engine, with at least one supercharger, at least one intercooler connected downstream from the supercharger, at least one cooling circuit which is connected to the intercooler, and at least one pressure setting device which controls the supercharger. It is provided that differential pressure determination of the charging air is used for ascertaining the icing state of the intercooler. Furthermore the invention relates to an internal combustion engine for implementing the process.

2 Claims, 1 Drawing Sheet

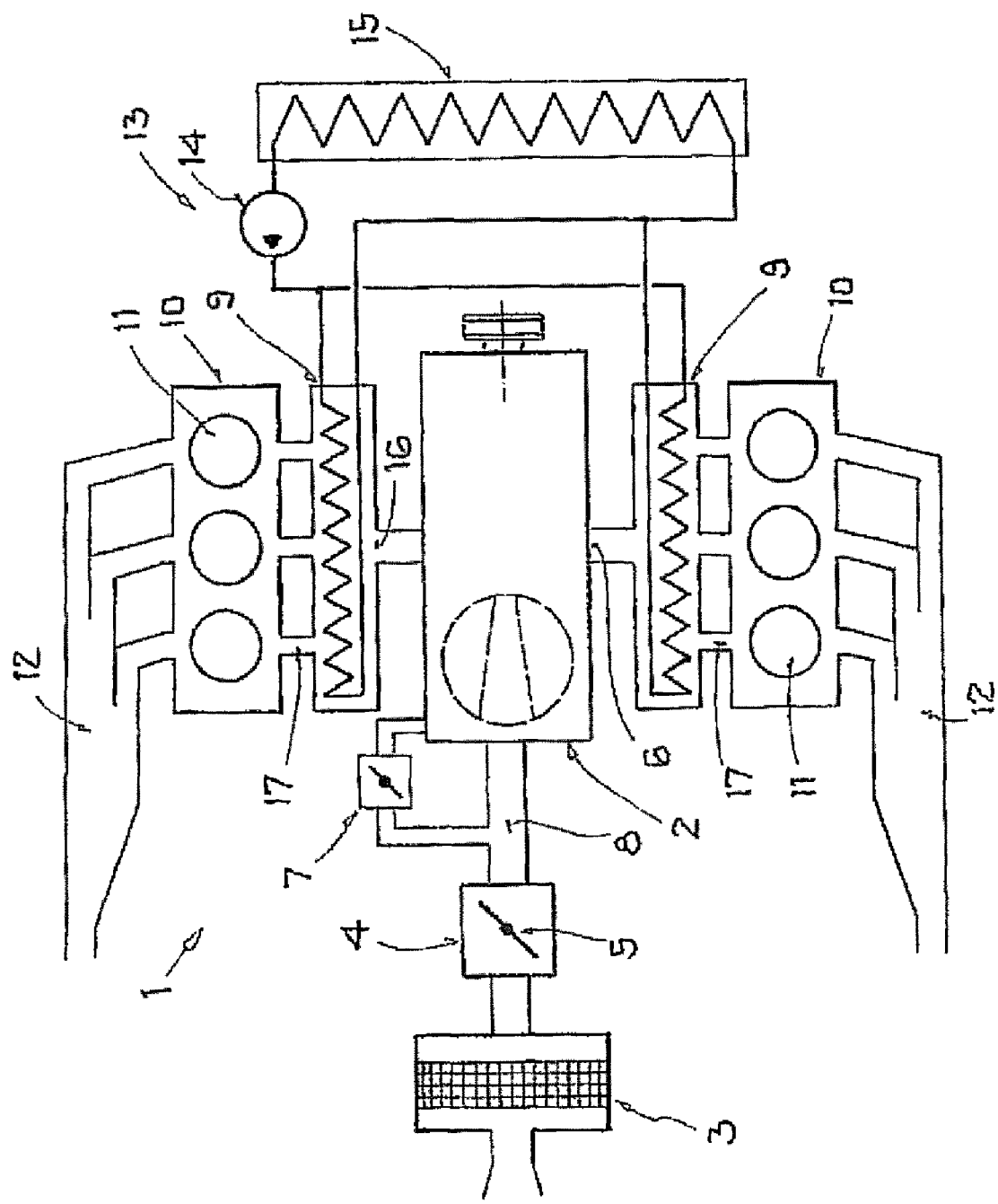

INTERCOOLER DEICING

The invention relates to a process for operating an internal combustion engine, with at least one supercharger, at least one intercooler connected downstream from the supercharger, at least one cooling circuit which is connected to the intercooler, and at least one pressure setting device which controls the supercharger.

BACKGROUND OF THE INVENTION

Internal combustion engines of the initially mentioned type are known. The supercharger assigned to the internal combustion engine is used to compress the air supplied to the internal combustion engine before it enters the combustion chambers. This measure increases the amount of air available for combustion or the air throughput, therefore the air mass flow per unit of time, compared to an internal combustion engine without a supercharger. The output of the internal combustion engine can be markedly increased by the larger amount of air available for combustion. The compression of the supplied medium, especially air, however, causes a temperature rise. It can be ascribed first of all directly to the compression, but the compressor side of a supercharger heats up during operation, for example, due to friction effects or the addition of heat from the heated medium or the turbine side, so that at low compression ratios the temperature of the medium is further increased.

This temperature increase of the medium is undesirable since it reduces the efficiency of the internal combustion engine. On the one hand, with rising temperature the air density decreases so that at the same combustion chamber volume the air mass available for combustion decreases, on the other hand the efficiency of the thermodynamic circulation process of the internal combustion engine drops due to the rising entry temperature. To avoid these disadvantages, the charging air which is supplied to the internal combustion engine and which originates from the supercharger can be cooled down to a lower temperature level using an intercooler. The intercooler is conventionally connected to a cooling circuit and is thus used as a heat exchanger between a cooling fluid and the charging air. In order to be able to control the charging pressure on the internal combustion engine there is a pressure setting device. By way of this pressure setting device already compressed air can travel back into the region upstream from the supercharger so that there is circulation. Especially at low outside temperatures it can happen that large amounts of cold air travel directly into the intercooler and ice forms in the intercooler. This raises the pressure loss between the supercharger and engine and thus reduces the efficiency of the supercharger and of the internal combustion engine. This can be the case especially during implementation of crankcase ventilation. The moisture contained in the air in this case can condense on the intercooler, whereupon ice can form.

The object of this invention is to make available a process for operating an internal combustion engine in order to be able to easily detect such an icing state of the intercooler and eliminate it by countermeasures.

SUMMARY OF THE INVENTION

This object is achieved according to the invention by the claimed process. In this case, according to the invention there is differential pressure determination of the charging air in order to be able to ascertain the icing state of the intercooler. If ice particles form in the cooling devices of the intercooler, this increases the pressure loss. By determining the pressure at different positions, thus an increased pressure difference, in particular a reduction of the internal combustion engine-side pressure can be ascertained.

One development of the invention calls for the differential pressure to be determined as an input-side and output-side differential pressure measurement on the intercooler and/or with a model. The pressure drop over the entire intercooler and not only over a partial region is detected by positioning of pressure receiving sites on the inlet and outlet devices of the intercooler. Thus, this represents a highly effective arrangement of the pressure receiving position. Furthermore, in the version according to the invention the pressure measurement device need not be placed in the intercooler itself, but can be placed on the connecting elements. This facilitates both production of the intercooler and also replacement of individual engine elements. Alternatively, equalization with a model or with modeled pressures is possible. Therefore there need not be a pressure measurement device at all positions.

One advantageous development of the invention calls for the input-side temperature level to be increased when an icing state of the intercooler is ascertained. The ice located in the intercooler is melted and thus an existing pressure loss over the intercooler is eliminated by the temperature increase of the fluid flowing into the intercooler.

One development of the invention calls for the input-side temperature level to be increased by setting a higher pressure ratio by means of the pressure setting device and/or reducing the performance of the cooling circuit. The pressure setting device is set here in conjunction with a throttle valve such that a higher pressure ratio arises at the same mass flow. Furthermore, the performance of the cooling circuit can be reduced, for example, by shutting off a pump contained in the cooling circuit with which the heating action on the intercooler is intensified.

One development of the invention is characterized in that the above described process is used during and/or after crankcase ventilation.

The invention furthermore comprises an internal combustion engine with at least one supercharger, at least one intercooler connected downstream from the supercharger, at least one cooling circuit which is connected to the intercooler, and at least one pressure setting device which controls the supercharger, in particular, for executing the process described above, on the intercooler there being a differential pressure determination device. The differential pressure can also be determined by using models.

BRIEF DESCRIPTION OF THE DRAWING

The FIGURE shows a schematic of the internal combustion engine illustrating an embodiment of the invention.

The FIGURE in a sectional view shows an internal combustion engine 1. The internal combustion engine 1 has a supercharger 2, which intakes outside air via an air filter 3 and a throttle device 4 which has a throttle valve 5. The air is thus brought to a higher pressure level and thus also temperature level in the supercharger 2. With the pressure setting device 7 the volumetric air flow which circulates around the supercharger 2 can be set and thus the amount of air supplied to the internal combustion engine 1 can be controlled. By way of the pressure setting device 7 therefore air can travel from the output side 6 of the supercharger 2 again into the inlet connection piece 8 upstream from the supercharger 2 and thus the pressure can be set in this way on the output side 6 of the supercharger 2 with the pressure setting device 7. On the output side 6 of the supercharger 2 intercoolers 9 are connected. They are provided to bring the air heated by the supercharger 2 back to a lower temperature level and thus to increase the density of the air in the internal combustion engine 1. From the intercooler 9 the air flows into the engine block 10 of the internal combustion engine 1, in particular by way of inlet valves which are not shown, into the cylinder space 11. After combustion in the cylinder space 11, the exhaust gases which have now formed are conveyed by way of the exhaust gas line 12 out of the engine block 10. The intercoolers 9 are connected to a cooling circuit 13 which cools the intercooler by means of a cooling fluid. For this purpose, the cooling circuit 13 has a pump 14 via which the cooling fluid is conveyed both through the intercooler 9 and also through a heat exchange device 15. If at this point a pressure difference is ascertained between the input side 16 and the output side 17 of the intercooler 9 by a differential pressure measurement device which is not shown, the pressure setting device 7 is set such that the pressure ratio is increased over the supercharger. In support, the cooling performance of the cooling circuit 13 can be reduced, in particular by reducing the delivery performance of the pump 14, especially after the pump 14 is shut off. Therefore a higher temperature level forms on the input side of the intercooler 9. Ice particles present in the intercooler 9 are melted by the higher temperature level. This reduces the pressure loss in the intercooler 9 and the pressure on the output side 17 rises relative to the pressure on the input side 16 of the intercooler 9. Less heat is removed from the air by reducing the performance of the cooling circuit 13. The resulting heating of the intercooler 9 further intensifies the described effect and melts ice to a greater extent.

The invention claimed is:

1. A process for controlling the condition of intake air supported an internal combustion engine provided with a supercharger, an intercooler disposed between said supercharger and said engine and a heat exchanger operatively connected to said intercooler, comprising:
   means for sensing the pressure differential across said intercooler; and
   means responsive to a selected one of said pressure differential for effecting at least one of a recirculation of air from an outlet to an inlet of said supercharger and an adjustment of the output of said heat exchanger.

2. A system for controlling the condition of intake air supplied to an internal combustion engine provided with a supercharger, an intercooler disposed between said supercharger and said engine and a heat exchanger operatively connected to said to said intercooler, comprising:
   means for sensing the pressure differential across said intercooler; and
   means responsive to a selected one of said pressure differential for effecting at least one of a recirculation of air from an outlet to an inlet of said supercharger and an adjustment of the output of said heat exchanger.

* * * * *